United States Patent [19]

Hays

[11] Patent Number: 5,750,040

[45] Date of Patent: May 12, 1998

[54] THREE-PHASE ROTARY SEPARATOR

[75] Inventor: Lance G. Hays, La Crescenta, Calif.

[73] Assignee: Biphase Energy Company, Placentia, Calif.

[21] Appl. No.: 655,480

[22] Filed: May 30, 1996

[51] Int. Cl.$^6$ ................................................. B01D 21/26
[52] U.S. Cl. ........................ 210/787; 210/767; 95/259; 95/261; 95/269; 415/80; 415/88; 415/202
[58] Field of Search ........................... 415/169.1, 202, 415/203, 80, 88, 143, 151; 60/649; 95/259, 261, 269, 270; 96/167, 171, 195, 200, 208, 209; 210/788, 787, 360.1, 512.1, 380.1, 512.3, 416.1; 494/37

[56] References Cited

U.S. PATENT DOCUMENTS

| | | |
|---|---|---|
| 2,531,896 | 11/1950 | Telbizoff . |
| 3,093,080 | 6/1963 | Tarifa et al. . |
| 3,358,451 | 12/1967 | Feldman et al. . |
| 3,749,513 | 7/1973 | Chute . |
| 3,838,668 | 10/1974 | Hays et al. . |
| 3,879,949 | 4/1975 | Hays et al. . |
| 3,936,214 | 2/1976 | Zupanick . |
| 3,972,195 | 8/1976 | Hays et al. . |
| 4,087,261 | 5/1978 | Hays . |
| 4,141,219 | 2/1979 | Elliot . |
| 4,227,373 | 10/1980 | Amend et al. . |
| 4,258,551 | 3/1981 | Ritzi . |
| 4,267,964 | 5/1981 | Williams . |
| 4,298,311 | 11/1981 | Ritzi . |
| 4,336,693 | 6/1982 | Hays et al. . |
| 4,339,923 | 7/1982 | Hays et al. . |
| 4,391,102 | 7/1983 | Studhalter et al. . |
| 4,441,322 | 4/1984 | Ritzi . |
| 4,511,309 | 4/1985 | Maddox . |
| 4,921,400 | 5/1990 | Niskanen ........................... 415/169.1 |
| 5,219,472 | 6/1993 | Elonen et al. ........................ 95/261 |
| 5,385,446 | 1/1995 | Hays . |
| 5,525,034 | 6/1996 | Hays . |

FOREIGN PATENT DOCUMENTS

| | | |
|---|---|---|
| 59-122702 | 7/1984 | Japan . |
| 64-80701 | 3/1989 | Japan . |

*Primary Examiner*—David A. Reifsnyder
*Attorney, Agent, or Firm*—William W. Haefliger

[57] ABSTRACT

The method of operating rotating separator apparatus, to which fluid, including gas and liquids is supplied in a fluid jet at via a nozzle, which includes separating the liquids from the gas in the stream, at a first zone within the rotating apparatus, and separating the liquids into liquids of differing density at a second zone within the apparatus.

19 Claims, 6 Drawing Sheets

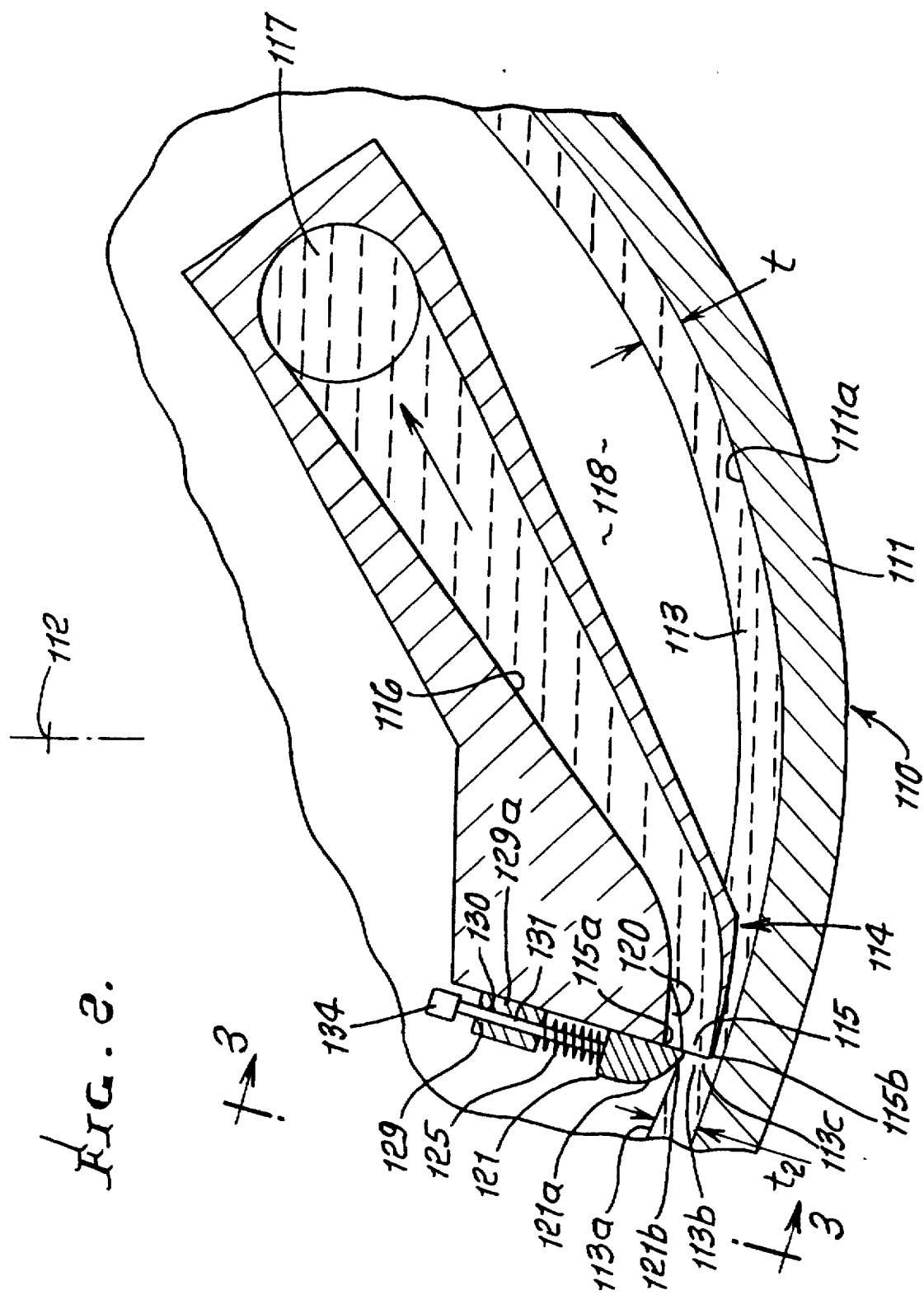

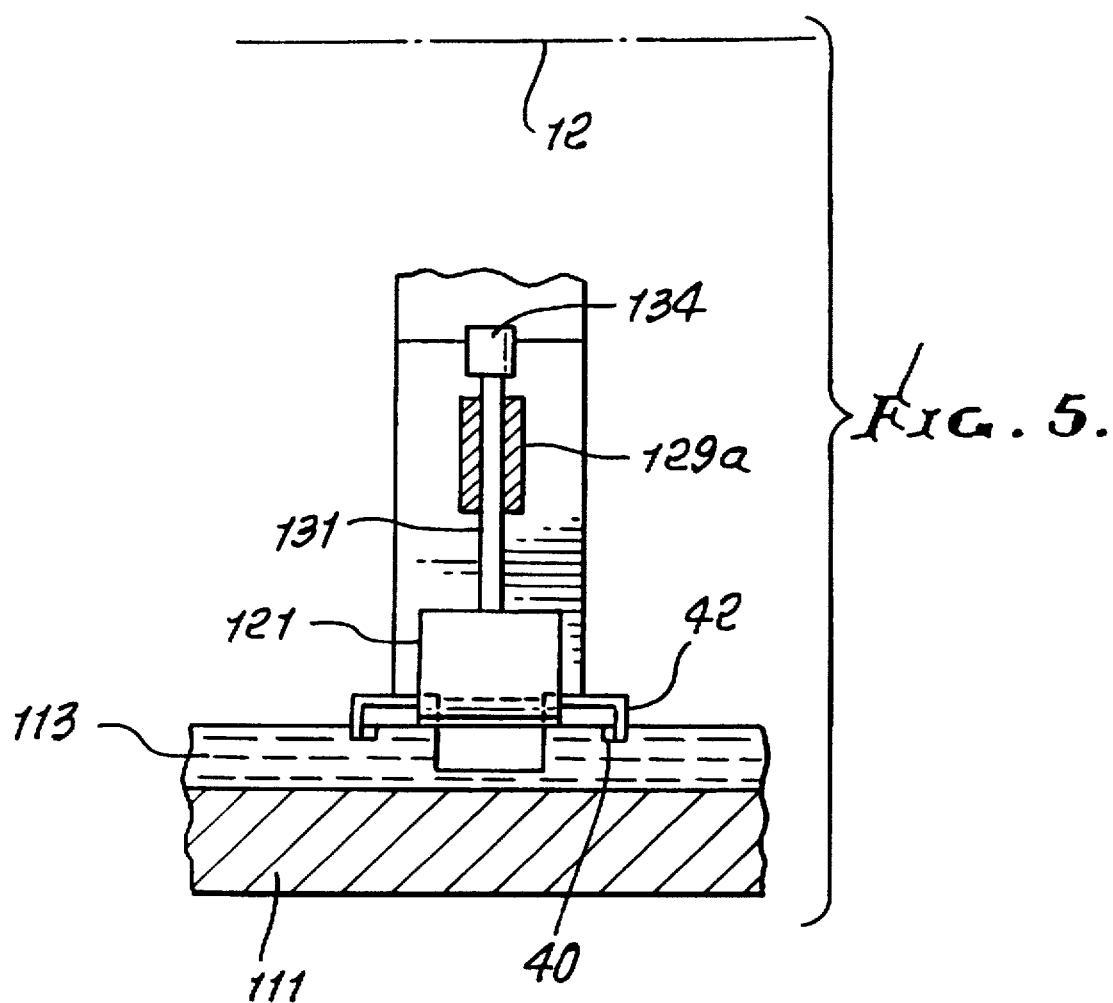

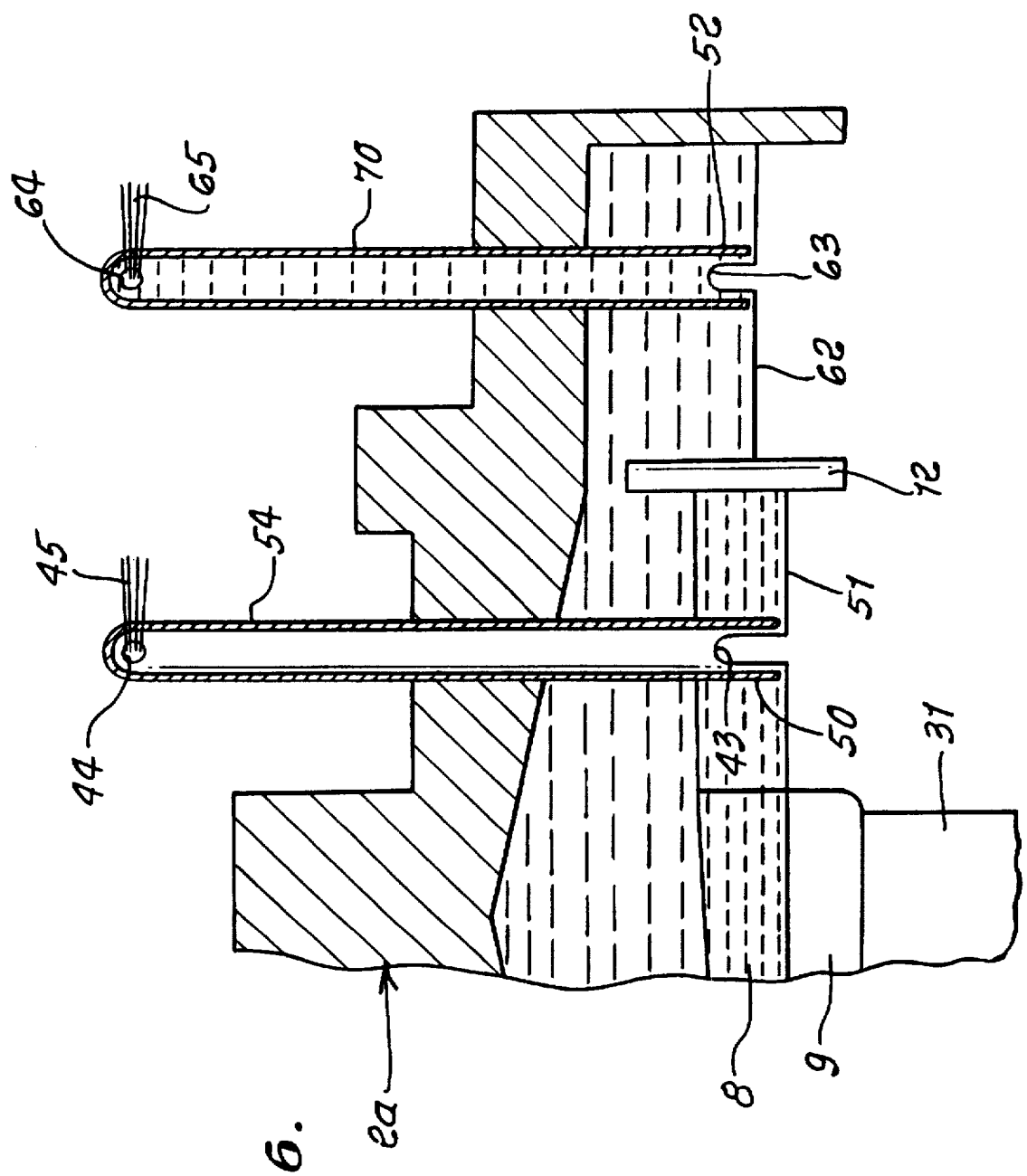

THREE-PHASE ROTARY SEPARATOR

BACKGROUND OF THE INVENTION

This invention relates generally to separation of three fluid phases—gas, oil and water, and more particularly concerns achieving such separation using rotating separator apparatus. In addition, the invention concerns methods of operating rotary separator apparatus in relation to scoop means immersed in a liquid ring on the rotary separator. Solids entrained in the flow must also be separated.

In existing non-rotary methods, a large gravity separation tank is required to be used, and only partial separation of oil and water phases is achievable. Therefore, additional treatment is required for separating those constituents. Secondary treatment methods require expenditure of large amounts of power, as for example via high speed centrifuges.

Another advantage is the size and weight of the required vessels. For offshore oil and gas productions, the large separation vessels require large, expensive structures to support their weight.

There is need for improved means to efficiently achieve separation of the three phases—gas, oil and water; further, there is need to achieve such separation in a mixture of such fluids passed through a nozzle, as in a jet stream.

SUMMARY OF THE INVENTION

It is a major object of the invention to provide a simple, effective method and apparatus meeting the above needs.

Basically, the above object is met by operating rotating separator apparatus to which fluid, including gas and liquids (as for example oil and water mixed together) is supplied in a fluid jet, as via a nozzle, the steps of the basic method including:

a) separating the liquids from the gas in the stream, at a first zone within the rotating apparatus, and b) separating the liquids into liquids of differing density at a second zone within the apparatus.

As will appear, the fluid jet has momentum which is utilized by transfer of energy from the jet to the rotating separator apparatus. Power may also be transferred from an external source to the rotating separator.

It is another object to provide method and apparatus to achieve complete separation of gas, oil, water, and solids. It operates either by the two-phase fluid energy or by a supplementary motor drive. It has a self-regulating feature to handle widely varying ratios of gas, oil and water with no external controls.

A further object concerns removal from the fluid jet of entrained solid particles, the method including providing a solids removal passage in the rotating separator apparatus, and including separating the particles which are separated by transfer to the passage.

Yet another object includes provision at the rotating separator apparatus of a passage for receiving a liquid A of higher density, providing at the apparatus an outlet for liquid A, and providing at the apparatus an outlet for liquid B of lesser density, the liquids A and B having a stable interface location determined by the relative locations of the outlets and passage, such that substantially complete separation of flowing liquids A and B occurs for a relatively wide range of flows. At least one of the outlets may advantageously be in the form of a scoop immersed in at least one of the liquids flowing as in a liquidous ring relative to the scoop. A movable inlet barrier may be provided in association with the scoop to block entry of gas into the scoop.

An additional object includes supporting the barrier for movement in response to changes in force applied to the barrier by at least one of the liquids flowing relative to the scoop.

A still further object includes providing one or more of the outlets at the rotating separator apparatus to have the form of an open weir, and flowing liquid via that weir to a passage leading to a liquid nozzle, as will be described.

Finally, it is an object of the invention to provide for liquid leaving the nozzle in the form of a jet producing thrust, and including transferring the thrust to the rotating separator apparatus.

These and other objects and advantages of the invention, as well as the details of an illustrative embodiment, will be more fully understood from the following specification and drawings, in which:

DRAWING DESCRIPTION

FIG. 2 is a fragmentary section showing details of a scoop having an entrained immersed in a rotating ring of liquids, and taken in a plane normal to the axis of separator rotation;

FIG. 5 is a view taken on lines 5—5 of FIG. 4; and

FIG. 6 is a fragmentary section showing an open weir outlet to a liquid nozzle.

DETAILED DESCRIPTION

Figure 1:
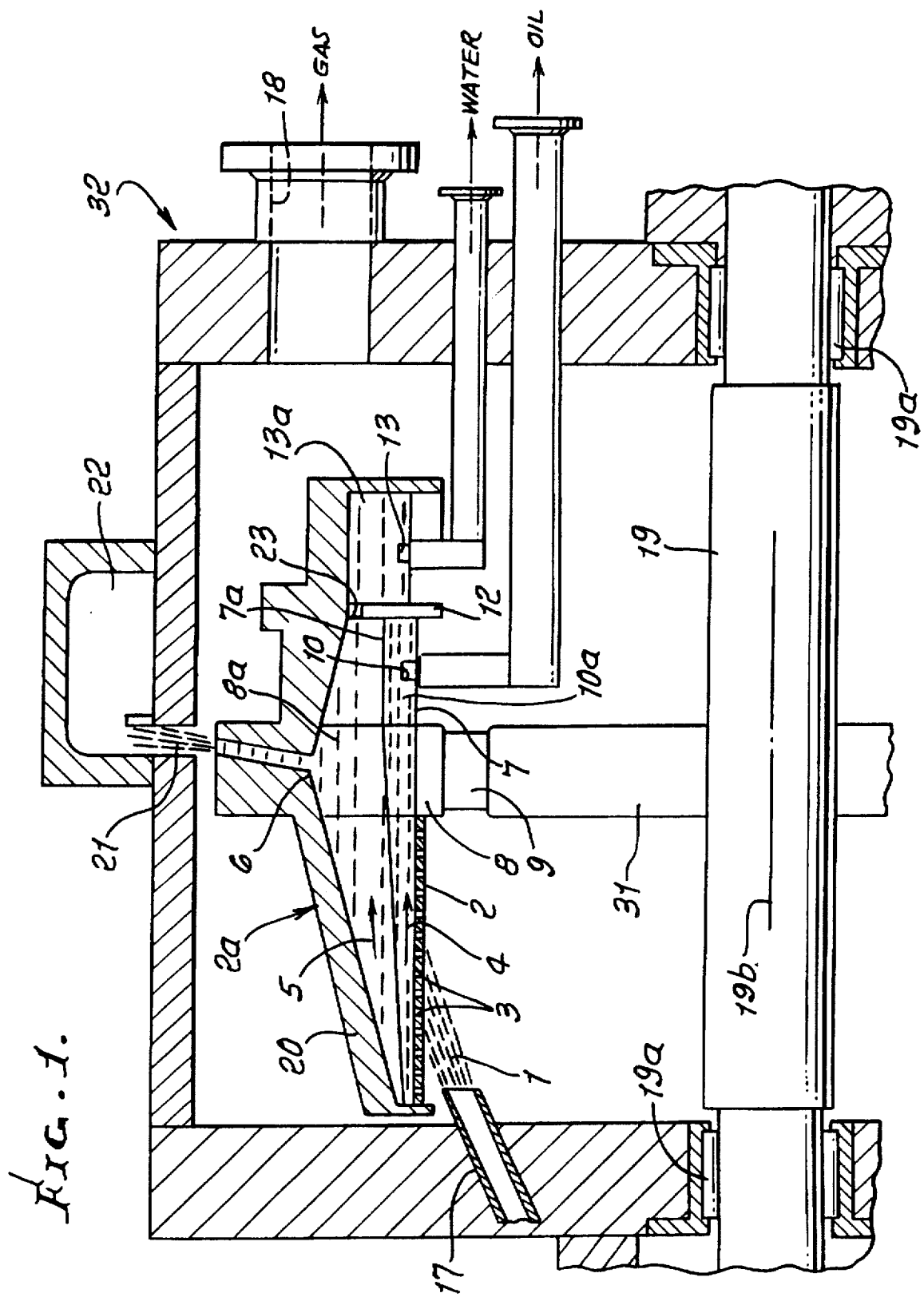
FIG. 1 is a sectional view, i.e., an axial radial plane, of three-phase rotary apparatus incorporating the invention.
Figure 1A:
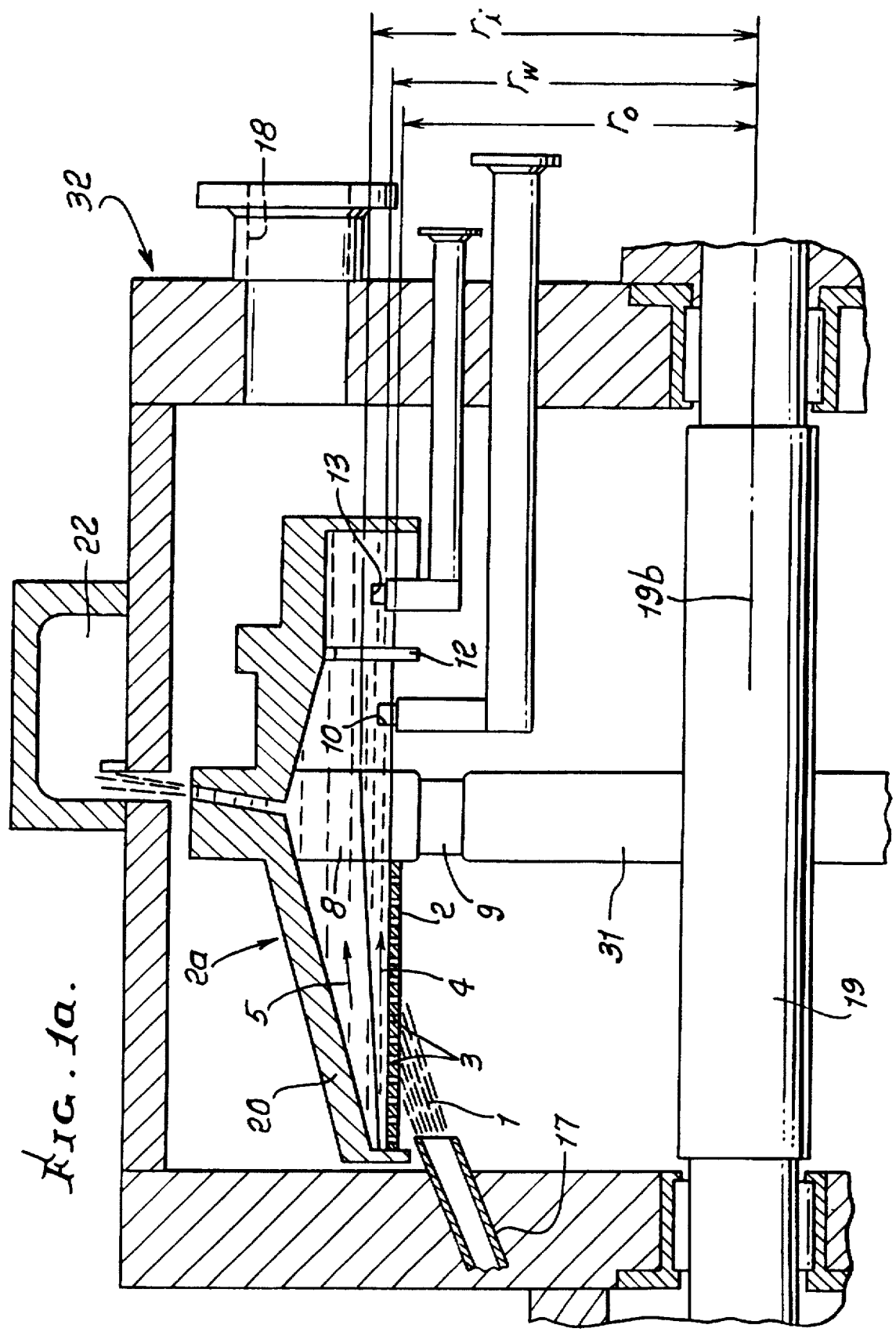
FIG. 1a is a view like FIG. 1.
Figure 3:
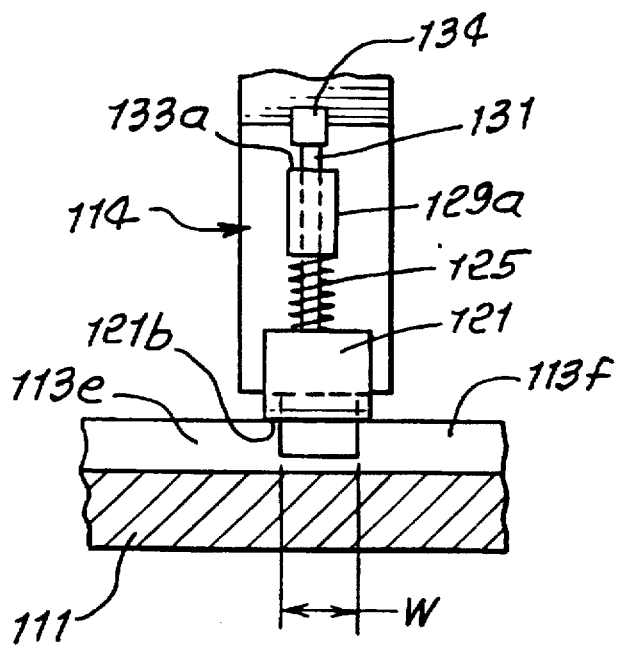
FIG. 3 is a fragmentary section taken on lines 3—3 of FIG. 2.

FIG. 1a shows a version of the three-phase rotary separator structure 32. A mixture of oil, gas and water is expanded in a nozzle 17. The resulting gas and liquid jet 1 is well collimated. The jet impinges generally tangentially onto a moving (rotating) surface 2. See in this regard the disclosure in U.S. Pat. No. 5,385,446, incorporated herein by reference. In the case shown, the surface is solid with holes 3, to permit drainage of the liquids and solids. Surface 2 is defined by the inner side of a rotating separator annulus 2a connected as by rotor 8 and structure 31 to a rotating shaft 19 of structure 32. Shaft bearings are shown at locations 19a. The moving surface may alternatively be comprised of the separated liquid, in which case no solid surface 2 is required.

The centrifugal force field acting on the gas and liquid jet, when it impacts the moving surface, causes an immediate radially inward separation of the gas from the liquids. The separated gas flows through gas blades 9 in the rotor 8, transferring power to the rotor and shaft 19. The gas leaves through an exit port 18. Blades 9 are spaced about the rotor axis 19b.

The oil and water, and any particulate solids, flow into the space between the outer wall 20 and the separating surface 2, in the centrifugal force field. The greater density of water causes it to acquire a radial outward velocity and separate from the oil flow 4. Separated water is indicated at 5. The separating oil and water flow axially through slots at location 8a in the rotor, toward the oil outlet 10, and toward the water outlet 13, respectively.

If the tangential velocity of the gas and liquid jet 1 impinging on the separating surface 2 is greater than the rotating surface speed, the liquids will be slowed by frictional forces transferring power to the separating surface and hence to the rotor and shaft. If the tangential velocity of the jet is lower than the desired rotating surface speed, external power must be transferred to the shaft, and hence rotor and separating surface, to drag the slower liquids up to the speed of the rotating surface. The power can be transferred, for example by a motor, or by the shaft of another rotary separator.

The solids, being heavier than the water, are thrown to the inner side of the wall 20. The solids are collected at the farthest radial position 6 of that wall, and flow at 21 with a small amount of water into a volute 22 from which they are discharged.

A barrier 12 to the balance of the water and oil flowing rightwardly forces the water to flow through structure-defined passages 23 located below (outwardly of) the water-oil interface 7, formed by the centrifugal force field.

The relative placement of the oil outlet 10 in the oil collection zone 10a, and the water outlet 13, in the water collection zone 13a beyond barrier 12 causes the oil-water interface 7a to form at a location radially outward of both the oil outlet and the water outlet, but which is radially inward from the water passages 23. This location of the rotating interface at 7a effects separation of the oil and water. Note that interface 7a intersects barrier 12, and that zones 10a and 13a are at opposite axial sides of barrier 12. The interface radial location is determined by the following relation, listing dimensions as shown in FIG. 1a:

$$\rho_o \omega(r_i^2 - r_o^2) = \rho_w \omega(r_i^2 - r_w^2)$$

where $\rho_o$=oil density
$\rho_w$=water density
$\omega$=rpm of surface 2
$r_i$=radius to oil-water interface
$r_o$=radius to oil outlet
$r_w$=radius to water outlet The interface location is independent of the relative amounts of water and oil, so long as the pressure drop of liquid in flowing from the interface location to the outlets is small compared to the large centrifugally-induced head from the rotating liquids. The liquid outlets are typically open scoops of the type shown in FIGS. 2, 3, 4, and 5.

In FIG. 1, a rotary separator is shown at 110 and having an annular portion 111 with a surface 111a facing radially inwardly toward the separator axis 112 of rotation (the same as axis 19b in FIG. 1). A liquid film or layer builds up as a ring 113 on the rotating surface and is shown to have a thickness "t". Such liquid may typically be supplied in a jet, as from a two-phase nozzle. The nozzle, jet and separator elements are schematically shown in FIG. 5. See also U.S. Pat. No. 5,385,446, incorporated herein by reference, and wherein the momentum of the jet is transferred to the separator at its inner surface 111a, inducing rotation.

A scoop or diffuser structure is provided at 114 for removing liquid in the ring 113. The scoop has an entrance 115 defined by radially separated inner and outer lips 115a and 115b presented toward the relatively oncoming liquid in the ring. Lip 115b is immersed in the liquid ring; and lip 115a is located radially inwardly of the inner surface 113a of the liquid ring. Ring liquid at 113b, radially inwardly of the scoop lip 115b, enters the scoop at 113c, and flows via a passage 116 in the scoop toward outlet 117. The scoop is normally non-rotating, i.e., fixed, or it may rotate, but at a slower rate than the separator.

Gas that has separated from the liquid that builds up as layer 113 collects in the separator interior, as at 118. Since lip 115a lies inwardly of the liquid ring inner surface 113a, there is a tendency for separated gas to enter the scoop at region 120, due to the drag effect of the rotating liquid ring upon the gas adjacent the liquid surface 113a.

Barrier structure is provided, and located proximate the scoop entrance or inlet, to block gas exiting to the scoop. One such barrier structure is indicated at 121, and as having a barrier surface 121a projecting radially outwardly of the scoop inner lip 115b, i.e., toward the liquid ring, whereby liquid on the ring travels relatively past barrier surface 121a to enter the scoop at its inlet. The barrier surface has a doctor tip extent, indicated at 121b, controlling the radial thickness at $t_2$ of the liquid ring that enters the scoop. In this regard, $t_2$ is normally less than $t_1$. The doctor tip extent 121b is also normally of a width (parallel to axis 112) about the same as that of the scoop inlet.

The barrier surface is shown to have taper in the direction of relative travel of liquid that enters the scoop, and that taper is preferably convex, to minimize or prevent build up of liquid in a turbulent wake at the scoop entrance. Note in FIG. 3 that the scoop inlet width w is of lesser extent than the liquid in the ring, i.e., ring liquid exists at widthwise opposite sides of the scoop, as at 113e and 113f.

Accordingly, separated gas is prevented, or substantially prevented, from entering the scoop to flow to the outlet, and an efficient gas-liquid separation is achieved.

Another aspect concerns the provision of means for effecting controllable displacement of the barrier structure toward the liquid ring, whereby the thickness $t_2$ of the liquid layer entering the scoop is controlled. In the FIG. 2 and FIG. 3 example, such barrier displacement control means is shown in the form of a spring 125, positioned to urge the barrier structure toward the liquid ring. A balance is achieved between the force of the spring acting to urge the barrier toward the liquid ring, and the force of liquid impinging on the convex surface 121a of the barrier, to position the barrier radially as a function of separator rotary speed, liquid ring rotary speed, and liquid viscosity, whereby a controlled rate of liquid ingestion into the scoop to match liquid supply to the ring is achieved, and without air ingestion, i.e., the inlet is left open to liquid inflow, but is blocked for gas.

Guide structure is also provided for guiding such displacement of the barrier structure as it moves in direction toward and away from the liquid ring. See for example engaged relatively sliding surfaces 129 and 130 of the barrier and scoop stem 131, attached to the scoop and sliding in the bore in a sleeve 129a attached to the scoop. A stop 134 on the stem is engageable with the end 133a of the sleeve to limit radially outward movement of the barrier structure, and its doctor tip, as referred to.

Figure 4:
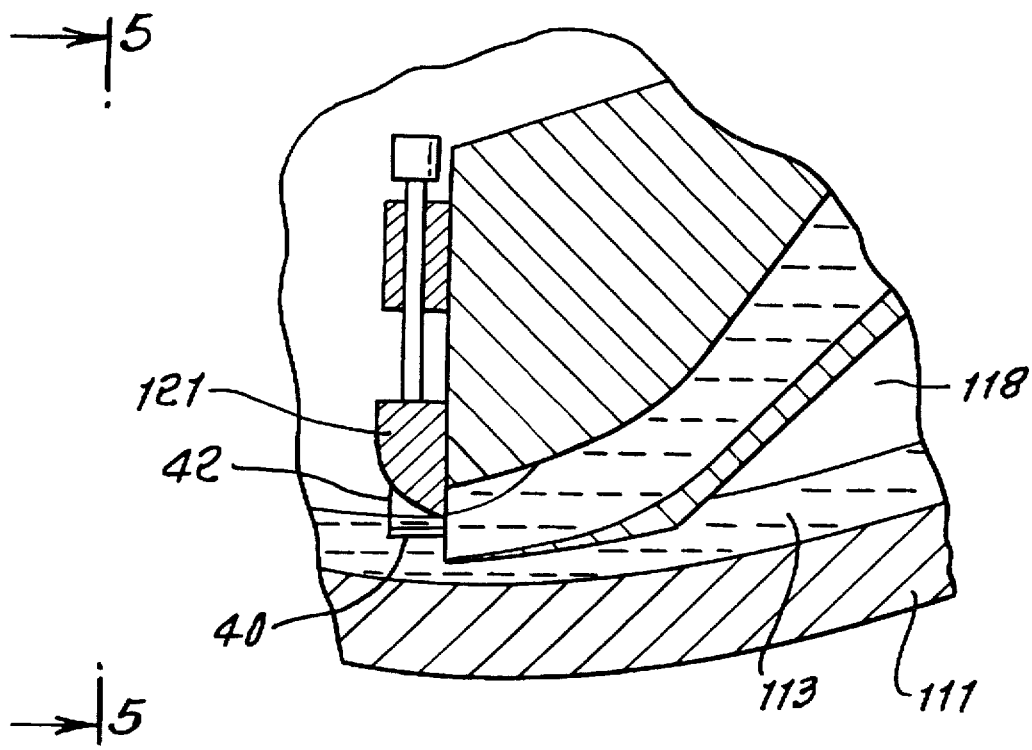
FIG. 4 is a view like FIG. 2 showing a modification.

FIGS. 4 and 5 show use of a foil 40 or foils immersed in the liquid and angled relative to the direction of liquid ring travel, to receive liquid impingement acting to produce a force component in a radially outward (away from axis 12) direction. That foil is connected to the barrier structure 121, as via struts 42, to exert force on the barrier acting to move it into or toward the liquid. Such force countered by the force exerted on the barrier convex surface, as referred to above, and a balance is achieved, as referred to. No spring is used in this example.

The advantage of these types of outlets for the three-phase separator are that large changes in liquid flow rate can be accommodated with only small changes in liquid height. This enables large changes in oil flow or water flow to be swallowed by the outlet without large increases in the pressure drop or location of the oil-water interface 7.

Another form of outlet is shown in FIG. 6. An open outlet passage 50 is placed at the location of the desired radially inwardly facing oil level 51. The oil flows into the passage and forms a gas-oil interface 43 51.at the location where the jet flow 45, from a liquid (oil) nozzle 44, which is produced by the centrifugally-induced head from that interface location, equals the incoming oil flow. Nozzle 44 is spaced radially outwardly from outlet passage 50, and connected thereto by a duct 54, which rotates with the rotor. The nozzle opening is preferably sized for the maximum possible oil flow. Flows less than that maximum cause the interface 43 to move more radially outward, reducing the head, and hence flow from the nozzle.

A similar arrangement is shown for the water outlet 52. The principles are the same as described for the oil outlet. See water radially inwardly facing level 62, gas-water interface 63, flow 65 from liquid (water) nozzle 64, and duct 70.

The provision of these outlets enables additional power to be generated from the reaction forces of the water and oil jets emanating from the associated nozzles. The outlet flows can be collected in volutes similar to that previously shown in FIG. 1a.

Either type of outlet can be used for either liquid, independently of the type of outlet chosen for the other liquid.

I claim:

1. In the method of operating a separator apparatus, which is rotating, to which fluid, including gas and liquids is supplied in a fluid jet as via a nozzle, the steps that include
   a) separating the liquids from the gas in said stream, at a first zone within said rotating apparatus, and
   b) separating the liquids into liquids of differing density at a second zone within said apparatus,
   c) said separating including providing a scoop immersed in at least one of said liquids traveling relative to the scoop.

2. The method of claim 1 wherein the fluid jet has momentum, and including transferring energy from the jet to said rotating separator apparatus.

3. The method of claim 2 including providing a rotating annular surface at which the liquids are separated from the gas.

4. The method of claim 3 wherein said surface is provided by providing a separator annulus that is ported to pass liquids centrifugally away from gas.

5. The method of claim 3 wherein said rotating annular surface is provided by separated liquids collecting centrifugally in a rotating ring.

6. The method of claim 1 including transferring power from an external source to said rotating separator apparatus.

7. The method of claim 1 wherein the fluid jet contains solid particles, and including providing a solids removal passage in the rotating separator apparatus, and including conducting the particles which are separated by centrifugal force to said passage.

8. The method of claim 1 including providing at said rotating separator apparatus an outlet for flowing liquid A of higher density, and providing at said rotating separator apparatus an outlet for flowing liquid B of lesser density, said liquids A and B having a stable interface location such that substantially complete separation of flowing liquids A and B occurs for a relatively wide range of flows.

9. The method of claim 8 which includes providing at least one of said outlets to comprise a scoop immersed in at least one of said liquids collecting as a centrifugally-induced liquidous ring traveling relative to the scoop.

10. The method of claim 9 including providing a movable inlet barrier to block entry of gas into the scoop.

11. The method of claim 10 including supporting the barrier for movement in response to changes in force applied to the barrier by at least one of said liquids flowing relative to the scoop.

12. The method of claim 8 which includes providing each of said outlets to comprise a scoop immersed in the liquid flowing to said outlet and collecting as a centrifugally-induced liquidous ring traveling relative to the scoop.

13. The method of claim 8 which includes providing at least one of said outlets to comprise an open weir.

14. The method of claim 13 which includes flowing liquid via said weir to a passage leading to a liquid nozzle.

15. The method of claim 8 applied to separating oil from water, and including providing said stable interface location to have radial location determined by the expression:

$$\rho_o \omega(r_i^2 - r_o^2) = \rho_w \omega(r_i^2 - r_w^2)$$

where $\rho_o$=oil density $\rho_w$=water density $\omega$=rpm $r_i$=radius to oil-water interface $r_o$=radius to oil outlet $r_w$=radius to water outlet.

16. The method of claim 15 which includes providing rotating barrier structure between said outlets, said barrier structure provided to have opposite axial sides and providing passage means for water to flow between said opposite axial sides and toward said water outlet, the oil and the water respectively collecting at said opposite axial sides of said barrier structure.

17. The method of claim 8 wherein said liquid A is water and said liquid B is oil, and including producing water and oil pressure heads in said water and oil flow via said nozzles, and discharging water and oil in jets pressurized by said heads, for producing thrust.

18. The method of claim 1 wherein blades are provided on said rotating separator apparatus, and including flowing the separated gas to the blades to produce power being transferred to the rotating separator apparatus.

19. In the method of operating rotating separator apparatus, to which fluid, including gas and liquids is supplied in a fluid jet as via a nozzle, the steps that include
   a) separating the liquids from the gas in said stream, at a first zone within said rotating apparatus, and
   b) separating the liquids into liquids of differing density at a second zone within said apparatus,
   c) providing at said rotating separator apparatus an outlet for flowing liquid A of higher density, and providing at said rotating separator apparatus an outlet for flowing liquid B of lesser density, said liquids A and B having a stable interface location such that substantially complete separation of flowing liquids A and B occurs for a relatively wide range of flows,
   d) providing at least one of said outlets to comprise an open weir, and flowing liquid via said weir to a passage leading to a liquid nozzle,
   e) and wherein said liquid leaves the nozzle as a jet, which produces thrust, and including transferring said thrust to said rotating separator apparatus.

* * * * *